(12) United States Patent
Wachter

(10) Patent No.: US 12,396,447 B2
(45) Date of Patent: Aug. 26, 2025

(54) FISHING POLE HOLDER WITH AUGER TIP

(71) Applicant: John Herbert Wachter, Brooklyn, NY (US)

(72) Inventor: John Herbert Wachter, Brooklyn, NY (US)

( * ) Notice: Subject to any disclaimer, the term of this patent is extended or adjusted under 35 U.S.C. 154(b) by 0 days.

(21) Appl. No.: 18/663,773

(22) Filed: May 14, 2024

(65) Prior Publication Data
US 2024/0381862 A1    Nov. 21, 2024

Related U.S. Application Data

(60) Provisional application No. 63/466,422, filed on May 15, 2023.

(51) Int. Cl.
*A01K 97/10*    (2006.01)

(52) U.S. Cl.
CPC .................... *A01K 97/10* (2013.01)

(58) Field of Classification Search
CPC ....... A01K 97/10; A45F 3/44; E04H 12/2223; E02D 5/801; A45B 2023/0012
See application file for complete search history.

(56) References Cited

U.S. PATENT DOCUMENTS

| | | | |
|---|---|---|---|
| 11,965,347 B1 * | 4/2024 | Horovitz | A45B 23/00 |
| 2014/0007487 A1 * | 1/2014 | Schwiebert | A45F 3/44 |
| | | | 114/295 |
| 2015/0208634 A1 * | 7/2015 | Box | A47B 88/00 |
| | | | 108/25 |
| 2016/0278359 A1 * | 9/2016 | Colton | A01K 97/10 |
| 2017/0055685 A1 * | 3/2017 | Head | F16M 11/28 |

* cited by examiner

*Primary Examiner* — Richard G Davis
(74) *Attorney, Agent, or Firm* — Dunlap Bennett & Ludwig, PLLC

(57) ABSTRACT

A device for holding a fishing rod or fishing pole includes a holder tube. The holder tube includes a body defining a cavity for receiving one end of the fishing pole or fishing rod, and an opening in the body at a proximal end of the holder tube. The device also includes an auger coupled to a distal end of the holder tube. The auger includes an auger bar and an auger plate. The auger plate is configured to assist with securing the auger in a surface in response to rotating the auger. The device further includes a handle removably coupled to the holder tube and the auger. The handle extends from opposing sides of the pole holder perpendicular to a long axis of the holder tube.

13 Claims, 6 Drawing Sheets

FISHING POLE HOLDER WITH AUGER TIP

CROSS-REFERENCE TO RELATED APPLICATIONS

This application claims the benefit of priority of U.S. provisional application No. 63/466,422, filed May 15, 2023, title, "Sand spike with auger tip for surf fishing." the entire contents of which are herein incorporated by reference.

FIELD

The present disclosure relates to holding devices and, more particularly, to fishing rod and/or pole holders.

BACKGROUND

Sand spike fishing rod holders are driven into the sand at the beach when fishing from the shore, for example, using live bait. They are notoriously difficult to drive into the compacted sand. If the sand spike is not secure, it will fail to hold the rod when a fish takes the bait.

As can be seen, there is a need for fishing rod and/or fishing pole holder that addresses the above drawbacks.

SUMMARY

In one aspect of the present disclosure, a device for holding a fishing rod or fishing pole includes a holder tube. The holder tube includes a body defining a cavity for receiving one end of the fishing pole or fishing rod, and an opening in the body at a proximal end of the holder tube. The device also includes an auger coupled to a distal end of the holder tube. The auger includes an auger bar and an auger plate. The auger plate is configured to assist with securing the auger in a surface in response to rotating the auger. The device further includes a handle removably coupled to the holder tube and the auger. The handle extends from opposing sides of the pole holder perpendicular to a long axis of the holder tube.

DETAILED DESCRIPTION OF THE DISCLOSURE

The following detailed description is of the best currently contemplated modes of carrying out exemplary embodiments of the disclosure. The description is not to be taken in a limiting sense but is made merely for the purpose of illustrating the general principles of the disclosure, since the scope of the disclosure is best defined by the appended claims.

As discussed above, sand spike fishing rod holders are driven into the sand at the beach when fishing from the shore. The rod holder typically consists of a rod holder with a rod (sand spike) attached to the holder. The rod is driven directly into the ground, which can be difficult for example, when the sand is compacted sand. Moreover, if the rod is not secure, the rod holder will be pulled from the sand when a fish takes the bait. Some rod holders have attempted to solve this problem by using foot pedals, allowing the user to use the force of his or her legs. This rod holder, however, provides no mechanical advantage with the user providing all the work necessary to drive the rod into the ground.

Broadly, an embodiment of the present disclosure provides a fishing rod or fishing pole holder system ("holder system") that provides for easy installation in the ground, e.g., sand. The holder comprises a holder tube, an auger, and a handle, e.g., T-handle. The auger includes an auger tip that assists with driving the holder system into the ground, e.g., sand. The T-handle allows the holder system to be twisted, thereby causing the auger tip to "bite" into the material of the ground. The holder system can be securely anchored into the sand with a few easy twists.

Figure 1:
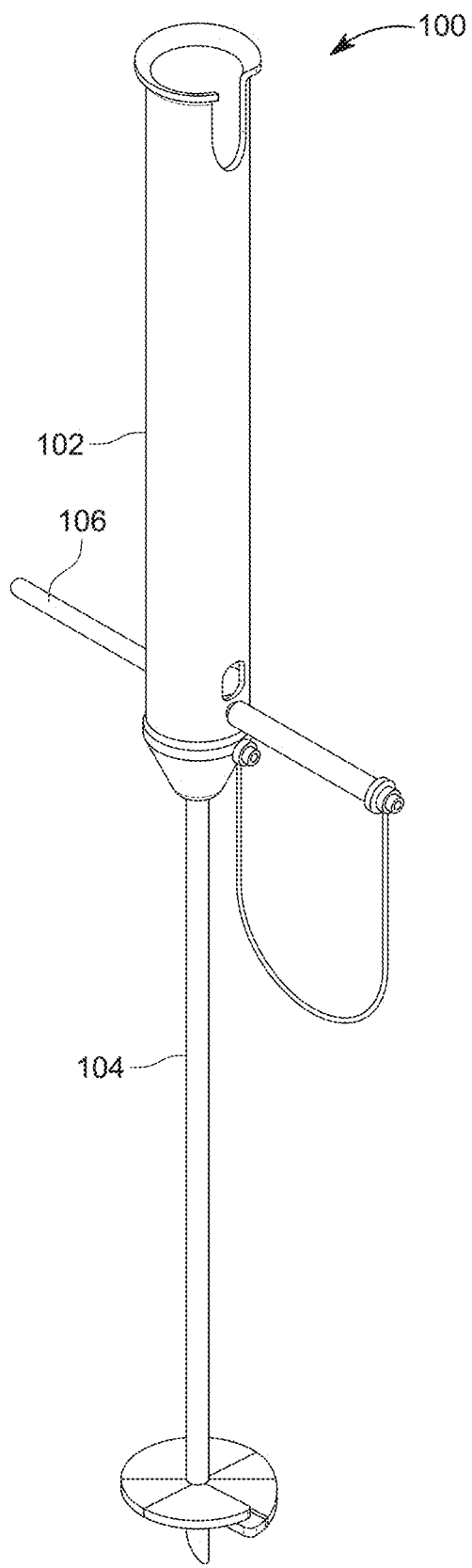
FIG. 1 is a front perspective view of a pole holder, according to aspects of the present disclosure.

Referring now to FIGS. 1-3, 4A, 4B, and 5A-5C, FIG. 1 illustrates a fishing rod or fishing pole holder system ("holder system 100") that provides for easy installation in the ground, according to aspects of the present disclosure. While FIG. 1 illustrates examples of components of the holder system 100, additional components can be added and existing components can be removed and/or modified.

Figure 3:
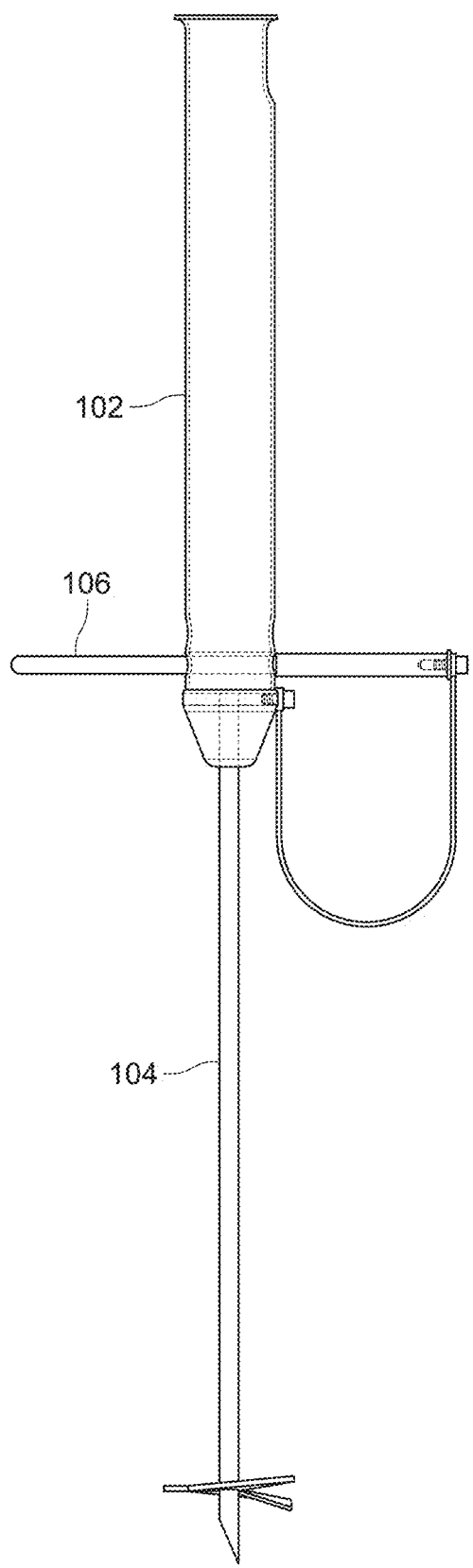
FIG. 3 is a front elevation view of the pole holder of FIG. 1, according to aspects of the present disclosure.

As illustrated in FIG. 1 and FIG. 3 (side view), the holder system 100 includes a holder tube 102, an auger 104, and a handle 106. The holder tube 102 operates to hold a fishing rod and/or fishing pole when holder system 100 is secured into the material of the ground. The auger 104 and handle 106 operate in concert to assist with securing the holder system 100 within the material of the ground. The auger 104 includes an auger tip that assists with driving the holder system into the material of the ground. In some embodiments, the auger tip can be a spiral plate as described in further detail below. In some embodiments, the auger tip can be a mechanical screw.

The handle 106 extends from opposing sides of the holder tube 102 to provide a gripping point for a user. The handle 106 allows the holder system 100 to be twisted, thereby causing the auger tip to "bite" into the material of the ground, thereby providing a force to pull the auger into the material of the ground. In embodiments, the material of the ground can be any combination of materials through around the auger 104 can secured. For example, the material of the ground can be sand. In another example, the material of the ground can be dirt.

Figure 2:
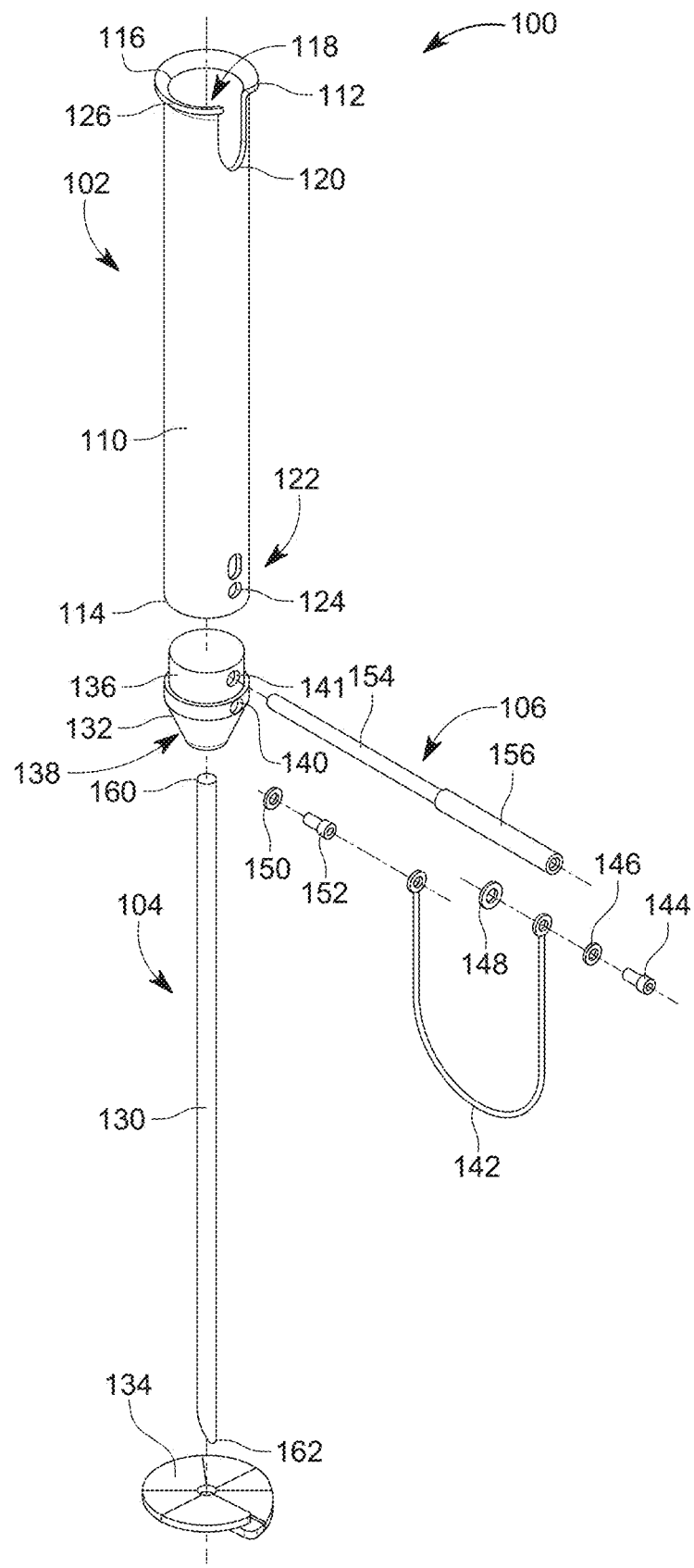
FIG. 2 is an exploded view of the pole holder of FIG. 1, according to aspects of the present disclosure.

As further illustrated in FIG. 2, which is an exploded view, the holder tube 102 can include a body 110 having a proximal end 112 and a distal end 114. The proximal end 112 can include a top opening 116 to a cavity 118 defined by the body 110. As illustrated, the body 110 can be constructed having a cylindrical shape, thereby defining a cylindrical shape for the cavity 118. The proximal end 112 of the body 110 can also include a notch 120 extending downward from the top opening 116. The proximal end 112 of the body 110 can also include a lip 126 that protrudes from the body 110. For example, the lip 126 can protrude outward and upward at an angle greater than 90 degrees. The body 110 also includes a connection holes 122 and a connection hole 124 for holding the handle 106, further described below.

In embodiments, the holder tube 102 can be construed of any type of durable material such as metal, metal alloy, synthetic polymer, natural material, composite metal, etc. For example, the holder tube 102 can be constructed of an aluminum alloy, e.g., 6061-T6 aluminum alloy (Unified Numbering System (UNS) designation A96061).

In operation, the holder tube 102 operates to hold a portion of a fishing rod and/or fishing pole. For example, an end and/or handle of a fishing rod and/or fishing pole can be inserted into the opening 116 into the cavity 118 of the body 110. As such, the holder tube 102 can hold the fishing rod and/or fishing pole stationary during fishing. The lip 126 can assist in inserting the end and/or handle of the fishing rod and/or fishing pole into the opening 116 by providing a slanted surface that directs the end and/or handle into the opening 116. The notch 120 can assist in removing/inserting the end and/or handle of the fishing rod and/or fishing pole.

The auger 104 includes an auger rod 130 having a proximal end 160 and a distal end 162. The proximal end 160 of the auger rod 130 is coupled to the holder tube 102 via a connection device 132, described below in further detail. The distal end 162 of the auger rod 130 can be tapered to a point to allow for easier insertion into the material of the ground. The auger 104 also includes an auger plate 134 coupled to the auger rod 130 adjacent to the distal end 162. As described below in further detail, the auger plate 134 can be formed of wedge sections that form a spiral along auger rod 130.

In embodiments, the auger rod 130 and/or auger plate 134 can be construed of any type of durable material such as metal, metal alloy, synthetic polymer, natural material, composite metal, etc. For example, the auger rod 130 and/or auger plate 134 can be constructed of an aluminum alloy, e.g., 6061-T6 aluminum alloy (UNS designation A96061).

The holder system 100 includes the connection device 132 for removably attaching the auger 104 to the holder tube 102. As further illustrated in FIGS. 4A, the connection device 138 includes a proximal section 136 and a distal section 138. The proximal section 136 has a cylindrical shape that fits within the distal end 114 of the body 110 of the holder tube 102. The distal section 138 of the connection device 132 can have a frustoconical shape that tapers away from the proximal end 134. In embodiments, the connection device 132 can be construed of any type of durable material such as metal, metal alloy, synthetic polymer, natural material, composite metal, etc. For example, the connection device 132 can be constructed of an aluminum alloy, e.g., 6061-T6 aluminum alloy (UNS designation A96061).

Figure 4A:
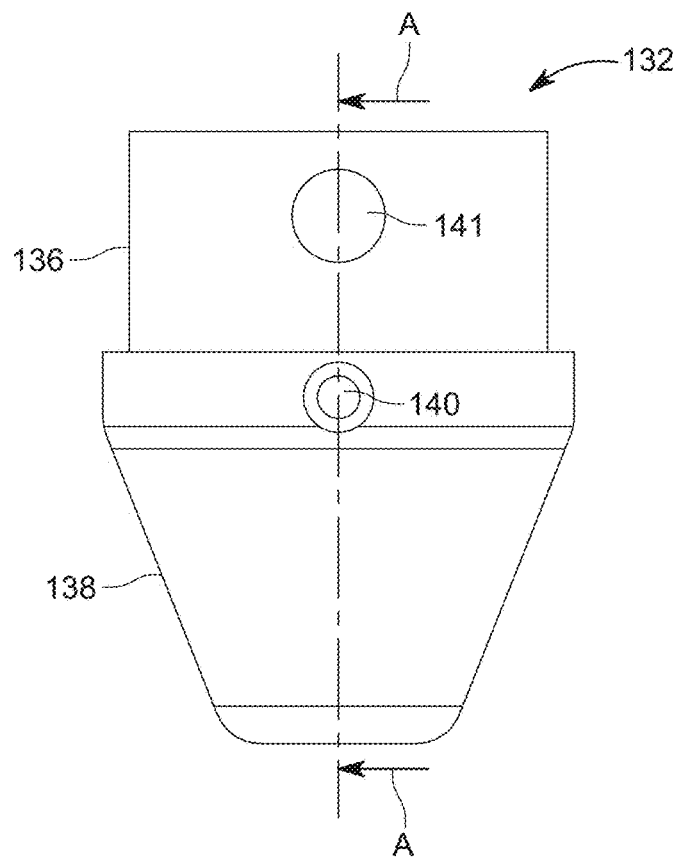
FIG. 4A is a side elevation view of a connection device of the pole holder of FIG. 1, according to aspects of the present disclosure.
Figure 4B:
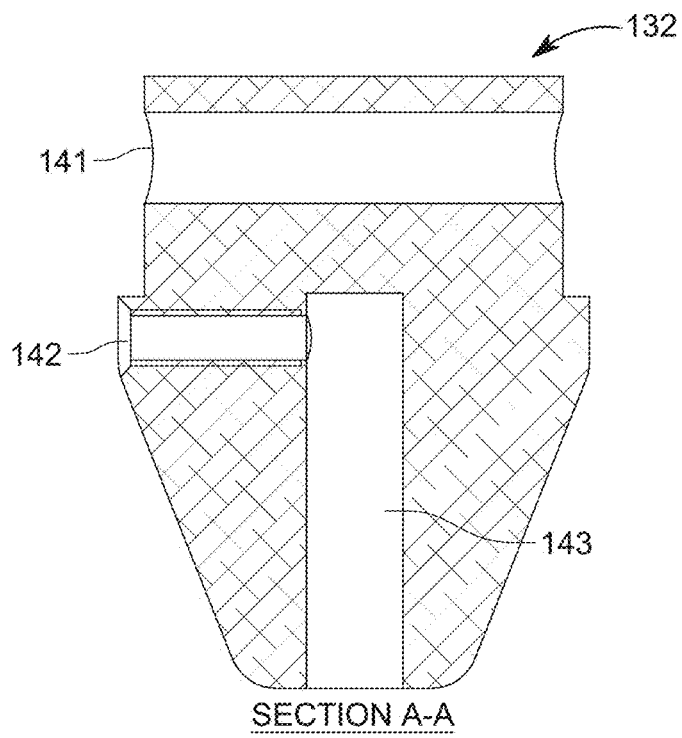
FIG. 4B is a cross-sectional view of the connection device of FIG. 4A; according to aspects of the present disclosure.

As illustrated in FIG. 4B, the connection device 132 can include a connection via 141 formed through the proximal section 136. When the proximal section 136 is inserted into the body 110 of the holder tube 102, the connection via 141 can be aligned with the connection holes 122 of the body 110. The handle 106 can be removably inserted through the connection via 141 and the connection holes 122 thereby removably coupling the auger 104 to the holder tube 102.

In embodiment, the handle 106 can be constructed as a cyclical bar and/or tube that includes a first section 154 and a second section 156. The first section 154 can have a diameter that is less than the diameters of the connection via 141 and the connection holes 122 thereby allowing the first section 154 to be inserted. The second section 156 can have a diameter that is larger than the diameters of the connection via 141 and the connection holes 122. As such, the handle 106 can be inserted until the second section 156 abuts the body 110 of the holder tube 102. In some embodiments, the handle 106 can be held within the connection via 141 and the connection holes 122 by friction and/or tension provided by the connection between the holder tube 102 and the connection device 132. In embodiments, the handle 106 can be construed of any type of durable material such as metal, metal alloy, synthetic polymer, natural material, composite metal, etc. For example, the handle 106 can be constructed of an aluminum alloy, e.g., 6061-T6 aluminum alloy (UNS designation A96061).

In embodiments, the handle 106 can be construed of any type of durable material such as metal, metal alloy, synthetic polymer, natural material, composite metal, etc. For example, the handle 106 can be constructed of an aluminum alloy, e.g., 6061-T6 aluminum alloy (UNS designation A96061).

The connection device 132 can also include a connection hole 142 formed in an upper portion of the distal section 138. The connection hole 142 can be aligned with the connection hole 124 to provide a connection point for a lanyard 142. The lanyard 142 can be coupled to connection hole 124 and connection hole 142 by a bolt and/or screw 152 and washer 150. The lanyard 142 can also be coupled to one end of the handle 106 by a bolt and/or screw 146, a washer 144, and a washer 148. The lanyard 142 can be constructed of any flexible or semiflexible material such as nylon.

The connection device 132 includes a cavity 143 having a cylindrical shape for receiving the proximal end 160 of the auger rod 130. In some embodiments, the auger rod 130 can be permanently affixed within the cavity 143. In some embodiment, the auger rod 130 can be removably held within the cavity 143 by the bolt and/or screw 152 and/or friction.

Figure 5A:
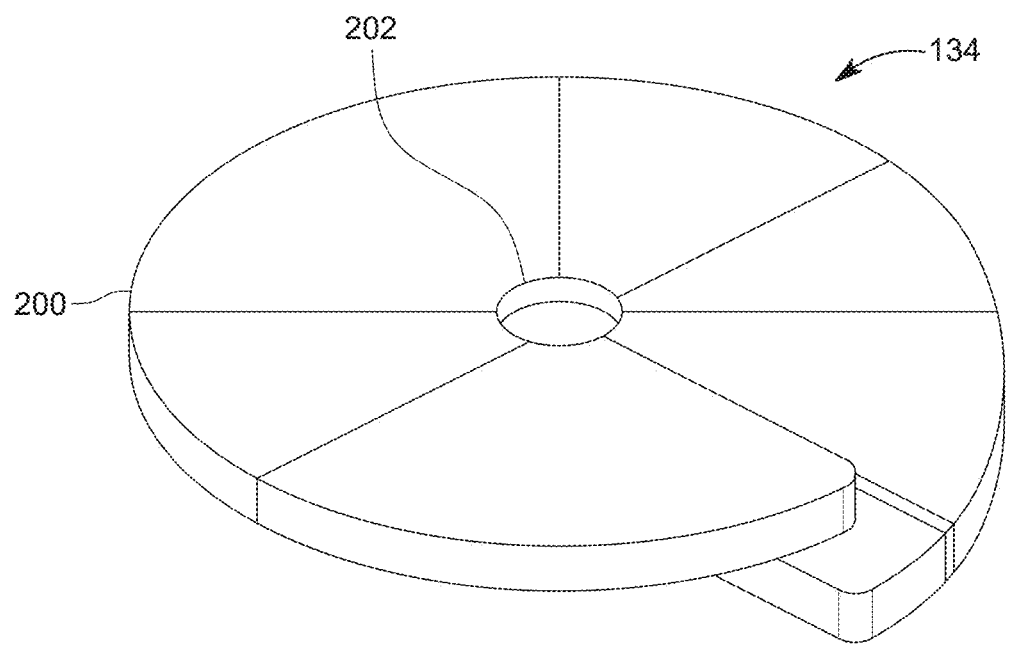
FIGS. 5A-5C are various view of an auger tip for an auger system of the pole holder of FIG. 1, according to aspects of the present disclosure.
Figure 5B:
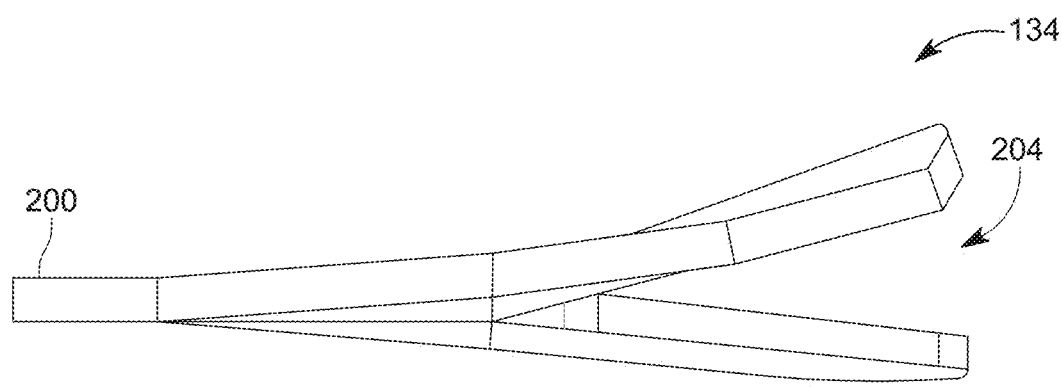
Figure 5C:
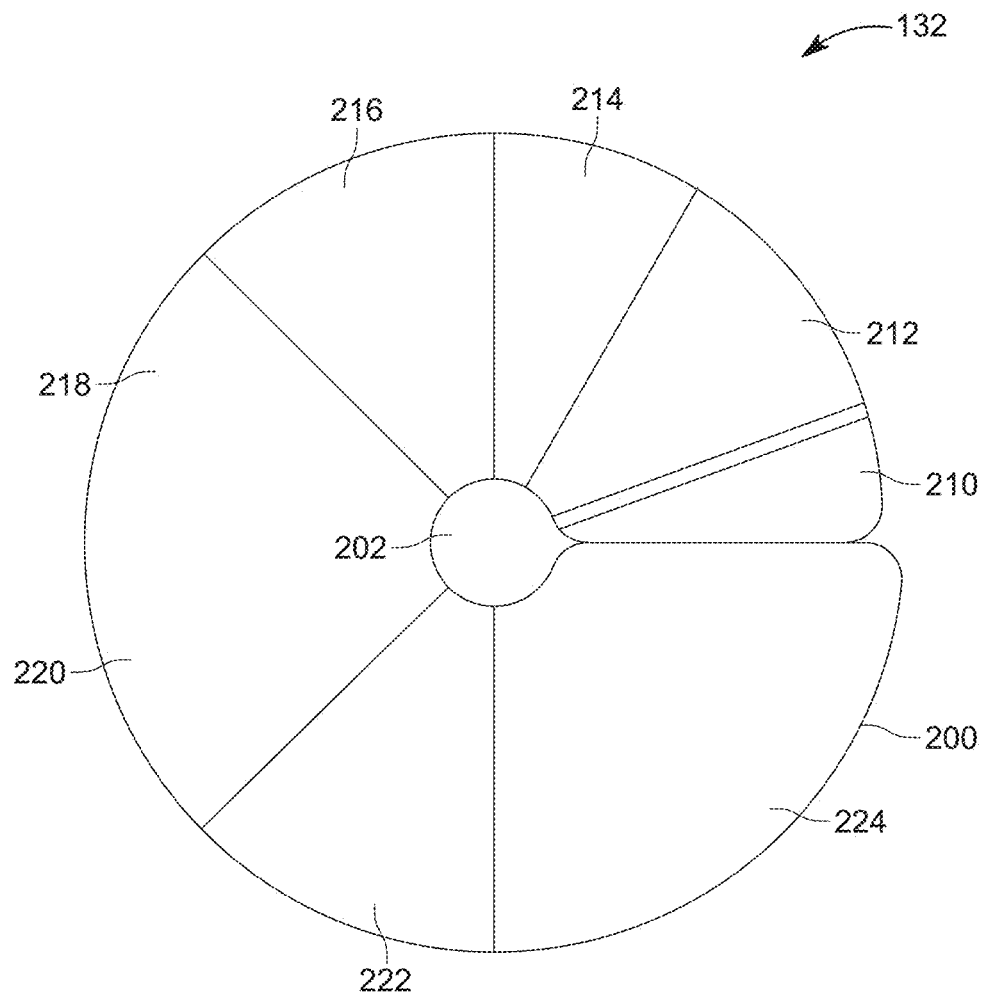

As illustrated in FIGS. 5A-5C, the auger plate 134 can include a spiral disk 200 having a number of sections formed about a central hole of the spiral disk 200. The spiral disk 200 is inserted over the auger rod 130 and affixed to the distal end 162 of the auger rod 130. As illustrated in FIG. 5C, the spiral disk 200 can include a central wedge 218 that is in a plane perpendicular to the long axis of the holder system 100. The spiral disk 200 can include a series of descending wedges 216, 214, 212, and 210 that are angled toward the distal end 162 of the auger rod 130 (relative to the central wedge 218). For example, the wedge 216 can be angled approximately 5 degrees downward relative to the central wedge 218; the wedge 214 can be angled approximately 5 degrees downward relative to the central wedge 218; the wedge 212 can be angled approximately 7 degrees downward relative to the central wedge 218; and the wedge 214 can be angled approximately 15 degrees downward relative to the central wedge 218. The spiral disk 200 can include a series of ascending wedges 222 and 224 that are angled toward the proximal end 160 of the auger rod 130 (relative to the central wedge 218). For example, the wedge 222 can be angled approximately 5 degrees upward relative to the central wedge 218 and the wedge 224 can be angled approximately 3 degrees upward relative to the central wedge 218. The angled wedges form a gap 204 between the wedge 210 and the wedge 224. In some of the embodiments, one or more of the wedges may have different relative arch lengths, e.g., different surface areas.

As illustrated in FIGS. 1 and 3, when the handle 106 is inserted, the handle 106 protrudes from opposing sides of the holder tube 102 and is approximately perpendicular to a long axis of the holder system 100, thereby forming a T shape. To install the holder system 100, a user can force the distal end 162 of the auger rod 130 into the ground until the auger plate 134 abuts the ground. A user can rotate the holder system 100 about the long axis of the holder system 100 using the handle 106. As the holder system 100 rotates, the auger plate 134 digs into the material of the ground, thereby providing a force to pull the auger into the material of the ground. The holder system 100 can be rotated until the auger reaches a desired depth.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements. As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

It should be understood, of course, that the foregoing relates to exemplary embodiments of the disclosure and that modifications can be made without departing from the spirit and scope of the disclosure as set forth in the following claims.

What is claimed is:

1. A device for holding a fishing rod or fishing pole, comprising:
a holder tube comprising:
a body defining a cavity for receiving one end of the fishing pole or fishing rod, and
an opening in the body at a proximal end of the holder tube;
an auger coupled to a distal end of the holder tube and comprising:
an auger bar, and
an auger plate configured to assist with securing the auger in a surface in response to rotating the auger, the auger plate comprising a plurality of disk wedges that form a spiral around the auger bar; and
a handle removably coupled to the holder tube and the auger, wherein the handle extends from opposing sides of the holder tube perpendicular to a long axis of the holder tube.

2. The device of claim 1, wherein the auger plate comprises:
a central wedge lying in a plane perpendicular to a long axis of the auger rod;
a plurality of descending wedges angled toward a distal end of the auger rod relative to the central wedge; and
a plurality of ascending wedges angle towards the proximal end of the auger rod.

3. The device of claim 1, further comprising:
a connection device that couples the auger to the holder tube, the connection device comprising:
a proximal section configured to be inserted into the distal end of the holder tube, and
a distal section having a cavity for receiving a proximal end of the auger bar.

4. The device of claim 3, wherein the proximal section has a cylindrical shape, and the distal section has a frustoconical shape.

5. The device of claim 3, wherein the handle is inserted through the holder tube and the proximal section of the connection device.

6. The device of claim 3, further comprising:
a lanyard coupled to the connection device at one end and coupled to the handle at a second end.

7. The device of claim 1, wherein one or more of the holder tube, the auger, or the handle are constructed of an aluminum alloy.

8. A device for holding a fishing rod or fishing pole, comprising:
a holder tube comprising:
a body defining a cavity for receiving one end of the fishing pole or fishing rod, and
an opening in the body at a proximal end of the holder tube;
an auger coupled to a distal end of the holder tube and comprising:
an auger bar, and
an auger plate configured to assist with securing the auger in a surface in response to rotating the auger;
a handle removably coupled to the holder tube and the auger, wherein the handle extends from opposing sides of the holder tube perpendicular to a long axis of the holder tube; and
a connection device that couples the auger to the holder tube, the connection device comprising:
a proximal section configured to be inserted into the distal end of the holder tube, and
a distal section having a cavity for receiving a proximal end of the auger bar, wherein the handle is inserted through the holder tube and the proximal section of the connection device.

9. The device of claim 8, wherein the auger plate comprises:
- a plurality of disk wedges that form a spiral around the auger bar.

10. The device of claim 9, wherein the auger plate comprises:
- a central wedge lying in a plane perpendicular to a long axis of the auger rod;
- a plurality of descending wedges angled toward a distal end of the auger rod relative to the central wedge; and
- a plurality of ascending wedges angle towards the proximal end of the auger rod.

11. The device of claim 8, wherein the proximal section has a cylindrical shape, and the distal section has a frusto-conical shape.

12. The device of claim 8, further comprising:
- a lanyard coupled to the connection device at one end and coupled to the handle at a second end.

13. The device of claim 8, wherein one or more of the holder tube, the auger, or the handle are constructed of an aluminum alloy.

\* \* \* \* \*